Jan. 13, 1931. O. A. FREDERICKSON 1,788,483
ARMORED ELECTRIC CABLE
Filed Dec. 9, 1927
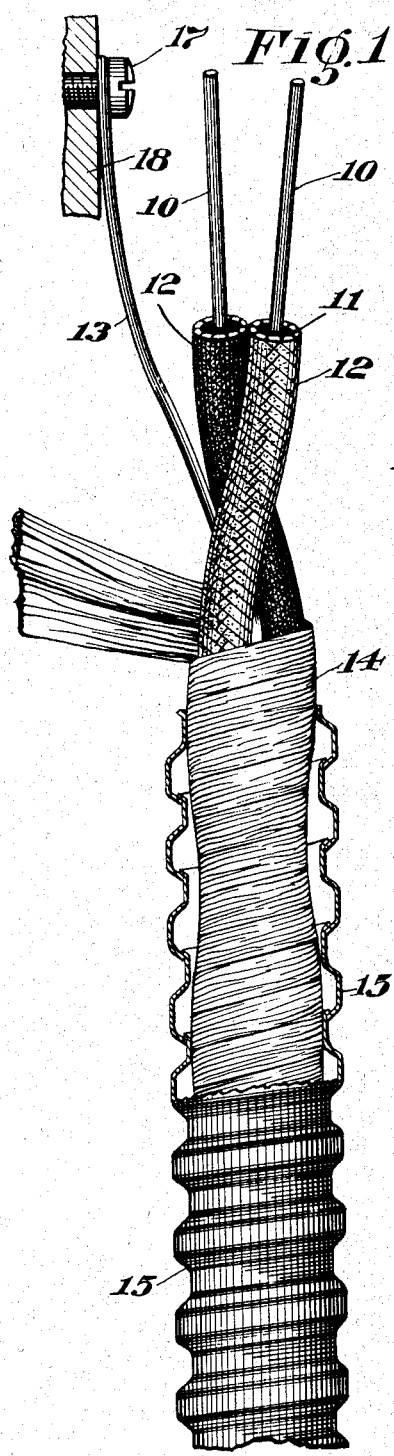
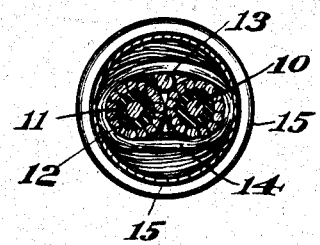
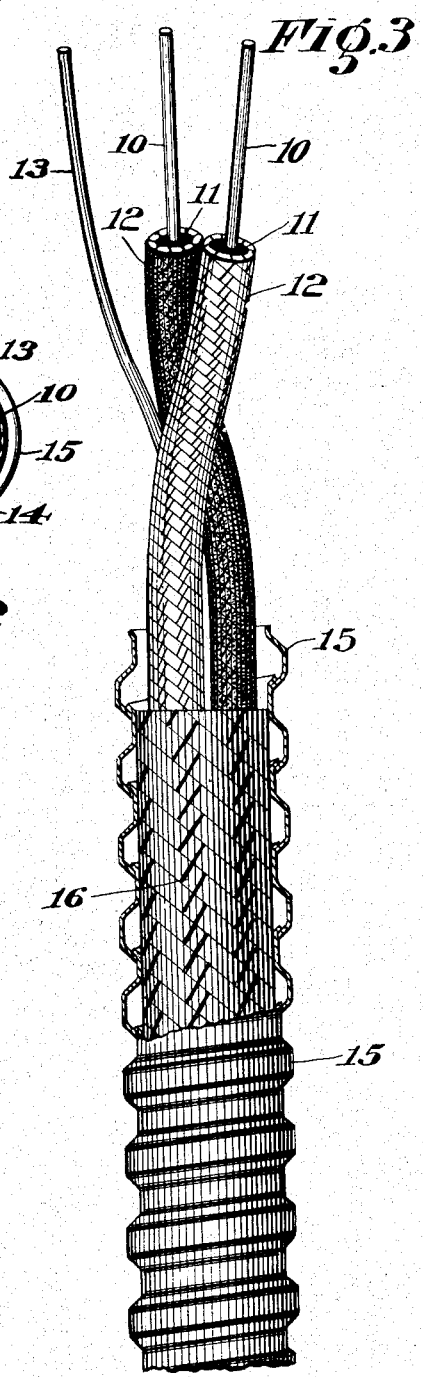
INVENTOR.
Otto A. Frederickson
BY
ATTORNEY Patented Jan. 13, 1931

1,788,483

UNITED STATES PATENT OFFICE

OTTO A. FREDERICKSON, OF WETHERSFIELD, CONNECTICUT, ASSIGNOR TO NATIONAL ELECTRIC PRODUCTS CORPORATION, OF PITTSBURGH, PENNSYLVANIA, A CORPORATION OF DELAWARE

ARMORED ELECTRIC CABLE

Application filed December 9, 1927. Serial No. 238,952.

This invention relates to electric conductors having a metallic outer jacket, and more particularly to reliable means for grounding the fixtures connected by the conductors.

Armored cables consisting of two or more insulated conductors that are enclosed in a spirally wound metal jacket have been extensively used heretofore, but such armored cables are open to the objection that the metal armor does not form a thoroughly reliable ground.

It is very important that metallic electric fixtures be well grounded to avoid the danger of a person who touches a fixture being subjected to a severe electric shock. When the metal jacket of the usual spirally wound armored cable is relied upon to ground the various electric fixtures in a house or other building it frequently happens that a defective ground occurs, either through failure of the mechanical connection between the armor of the cable and a fixture to form a good electrical connection, or to the high resistance which the spiral coils of the armored jacket may offer to the passage of the current.

In many cases the covering of the insulating material lying next to the inner wall of the armored jacket is treated with a relatively thick layer of paraffin or other moisture-proofing substance. This moisture-proofing substance frequently enters the cracks between the adjacent coils of the metal jacket and serves to insulate the adjacent coils, thereby decreasing the conductivity of the metal jacket.

Having in mind the foregoing, the present invention relates to a simple construction whereby a reliable ground connection may be formed between the electric fixtures or outlet boxes connected by spirally wound armored cables.

The novel features of the invention will be best understood from the following description when read in connection with the accompanying drawings showing good practical forms of the invention.

In the drawings:

Fig. 1 is a side elevation with parts in section of a spiraly wound armored cable embodying the features of the present invention;

Fig. 2 is a transverse sectional view through the cable of Fig. 1; and

Fig. 3 is a view similar to Fig. 1, but shows a modified construction.

The armored cable embodying the features of the present invention may be provided with two or more insulated electric conductors, two being shown in the drawings. Each of these conductors may consist of a wire 10 having the usual insulation consisting of a rubber jacket 11 about which a covering 12 of braid is provided, and the covered conductors are preferably twisted about each other as shown to facilitate bending the armored jacket in which they are enclosed.

Alongside the covered conductors 10 is laid a ground wire 13 which is preferably bare as shown, and about the insulated conductors 10 and ground wire 13 is provided the outer insulating covering 14. This covering may be formed of one or more strips of fibrous material such as paper wound spirally around the conductors as shown in Fig. 1, or the outer insulating covering may be braided as indicated by 16 in Fig. 3, or this covering may be otherwise constructed.

The particular construction of the armored outer jacket 15 forms no essential part of the present invention and this armor may be formed of a spirally wound metal strip having the usual or any preferred construction.

The ground wire 13 may be secured by a screw 17 to the wall 18 of an outlet box or other electric fixture to which the wires 10 lead, to thereby insure proper grounding of said box or fixture. Since the ground wire 13 lies within the insulating covering 14 it is insulated by such covering from the armored jacket 15, and it is also mechanically protected by the covering 14 from injury. If the ground wire 13 were not protected by the covering 14 or 16 it would stand a much greater chance of being injured or severed when the outer armored jacket is cut, but the covering retains the wire 13 in a valley between the covered conductors and protects it from injury.

It will be seen from the foregoing that the ground wire 13 constitutes a thoroughly reliable ground which may be easily secured to a wall of an electric fixture to complete the electric circuit, thus making it unnecessary to rely upon the armored jacket 15 to form the ground. Furthermore, by using the ground wire 13 to form the desired ground, it is feasible to entirely insulate the armored jacket 15 from the enclosed conductors and from the electric fixtures to which the conductors are connected, a feature which may be desirable in certain installations.

What is claimed is:—

An armored electric cable having means insulated from the armored outer jacket for grounding the electric fixture supplied with current by the cable, comprising a pair of covered electric conductors laid side by side, a bare ground wire laid in the valley between the covered conductors to form a ground leading from the fixture to which the conductors are connected, a protecting covering of insulating material surrounding and uniting the covered conductors and ground wire, a flexible armored jacket formed of a metal strip that is wound spirally about said protecting covering, and the ground wire being confined in the valley of the covered conductors by said protecting covering and completely insulated by this covering from the armored jacket.

In testimony whereof, I have signed my name to this specification.

OTTO A. FREDERICKSON.